United States Patent

Solihin

(10) Patent No.: US 9,166,930 B2
(45) Date of Patent: Oct. 20, 2015

(54) WAVED TIME MULTIPLEXING

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 374 days.

(21) Appl. No.: 13/823,361

(22) PCT Filed: Oct. 30, 2012

(86) PCT No.: PCT/US2012/062532
§ 371 (c)(1),
(2) Date: Mar. 14, 2013

(87) PCT Pub. No.: WO2014/070137
PCT Pub. Date: May 8, 2014

(65) Prior Publication Data
US 2014/0119363 A1 May 1, 2014

(51) Int. Cl.
*H04L 12/937* (2013.01)
*H04L 12/933* (2013.01)
*H04L 12/773* (2013.01)

(52) U.S. Cl.
CPC .............. *H04L 49/253* (2013.01); *H04L 45/60* (2013.01); *H04L 49/109* (2013.01)

(58) Field of Classification Search
CPC ............... H04L 5/00; H04L 5/60; H04L 5/62; H04L 5/70; H04L 49/00; H04L 49/10; H04L 49/109; H04L 49/15; H04L 49/25
See application file for complete search history.

(56) References Cited

U.S. PATENT DOCUMENTS

| | | |
|---|---|---|
| 6,330,236 B1 | 12/2001 | Ofek et al. |
| 6,788,664 B1 | 9/2004 | Thomas et al. |
| 7,266,110 B1 | 9/2007 | Cao et al. |
| 2011/0176804 A1 | 7/2011 | Blinkert et al. |
| 2011/0197195 A1 | 8/2011 | Cai et al. |
| 2011/0271126 A1 | 11/2011 | Hill |

(Continued)

OTHER PUBLICATIONS

Bjornstad, S. et al., "A Hybrid Packet/Time Slotted Circuit Switched Scheme (HPTS)," Transparent Optical Networks, 2008. ICTON 2008. 10th Anniversary International Conference on. vol. 3. IEEE, 2008.

(Continued)

*Primary Examiner* — Anh Ngoc Nguyen
(74) *Attorney, Agent, or Firm* — Turk IP Law, LLC

(57) ABSTRACT

Technologies generally described herein relate to waved time multiplexing. In some examples, a command flit can be transmitted from a sender node of a network-on-chip ("NOC") to a destination node of the NOC via an intermediate node along a circuit-switched path. The command flit can include an interval period and a release duration. When the command flit has been transmitted, one or more data flits can be transmitted from the sender node to the destination node via the intermediate node along the circuit-switched path. The sender node, the destination node, and the intermediate node can be configured to reserve router resources of the sender node, the destination node, and the intermediate node respectively for circuit-switched traffic during a use duration of the interval period and to release the router resources for packet-switched traffic during the release duration in a waved time multiplex arrangement.

25 Claims, 9 Drawing Sheets

(56) References Cited

U.S. PATENT DOCUMENTS

2013/0188486 A1* 7/2013 Thacker et al. ............... 370/235
2013/0322459 A1* 12/2013 Xu ................................ 370/412

OTHER PUBLICATIONS

International Search Report & Written Opinion dated Dec. 21, 2012 in PCT Application No. PCT/US12/62532.
Modarressi, M. et al.:"A hybrid packet-circuit switched on-chip network based on SDM", Design, Automation & Test in Europe Conference & Exhibition, 2009. Date '09. Date of Conference: Apr. 20-24, 2009, p. 566-569.

Lusala, A.K; Legat, J.D.:"A hybrid NoC combining SDM-based circuit switching with packet switching for real-time applications", NORCHIP, 2010, Date of Conference: Nov. 15-16, 2010, pp. 1-4.
Shekhar Borkar, Andrew A. Chien, "The Future of Microprocessors", Communications of the ACM, vol. 54, No. 5, pp. 67-77, 2011.
Natalie Enright Jerger, Mikko H. Lipasti, Li—Shivan Peh, "Circuit-Switched Coherence", In 2nd Annual IEEE Network on Chip Symposium, Newcastle-Upon-Tyne, UK, Apr. 2008.
Secchi, S., et al., "A Network on Chip Architecture for Heterogeneous Traffic Support with Non-Exclusive Dual-Mode Switching," 11th EUROMICRO Conference on Digital System Design Architectures, Methods and Tools, pp. 141-148 (Sep. 3-5, 2008).

* cited by examiner

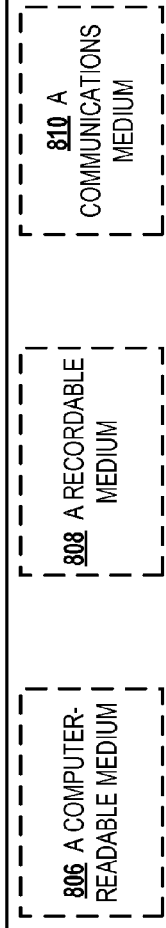

800 A COMPUTER PROGRAM PRODUCT

802 A SIGNAL BEARING MEDIUM

804 AT LEAST ONE OF

ONE OR MORE INSTRUCTIONS FOR TRANSMITTING A COMMAND FLIT FROM A SENDER NODE OF A NETWORK-ON-CHIP ("NOC") TO A DESTINATION NODE OF THE NOC VIA AT LEAST ONE INTERMEDIATE NODE ALONG A CIRCUIT-SWITCHED PATH, WHEREIN THE COMMAND FLIT INCLUDES AN INTERVAL PERIOD AND A RELEASE DURATION; OR

ONE OR MORE INSTRUCTIONS FOR UPON TRANSMITTING THE COMMAND FLIT, TRANSMITTING ONE OR MORE DATA FLITS OF A DATA PACKET FROM THE SENDER NODE TO THE DESTINATION NODE VIA THE INTERMEDIATE NODE ALONG THE CIRCUIT-SWITCHED PATH, WHEREIN THE SENDER NODE, THE DESTINATION NODE, AND THE INTERMEDIATE NODE ARE CONFIGURED TO RESERVE ROUTER RESOURCES OF THE SENDER NODE, THE DESTINATION NODE, AND THE INTERMEDIATE NODE RESPECTIVELY FOR CIRCUIT-SWITCHED TRAFFIC DURING A USE DURATION OF THE INTERVAL PERIOD AND TO RELEASE THE ROUTER RESOURCES FOR PACKET-SWITCHED TRAFFIC DURING THE RELEASE DURATION IN A WAVED-TIME MULTIPLEX ARRANGEMENT.

| 806 A COMPUTER-READABLE MEDIUM | 808 A RECORDABLE MEDIUM | 810 A COMMUNICATIONS MEDIUM |

FIGURE 8

WAVED TIME MULTIPLEXING

CROSS-REFERENCE TO RELATED APPLICATIONS

The present application is a U.S. National Stage filing under 35 U.S.C. §371 of International Application No. PCT/US12/62532, filed on Oct. 30, 2012.

BACKGROUND

Unless otherwise indicated herein, the materials described in this section are not prior art to the claims in this application and are not admitted to be prior art by inclusion in this section.

Data centers sometimes rely upon computing systems having multicore chips to run servers. With the current rate of technology scaling, the number of cores that can be integrated into each multicore chip may double about every two to three years. While this rate is expected to begin decreasing, the number of cores that can be included in a multicore chip can be expected to continue to increase for the foreseeable future.

With the ever-increasing number of cores in multicore chips, one challenge is the power usage of each core. In particular, the threshold voltage of the cores can reach a point at which further downscaling may be impossible without increasing static power consumption of the chips. Thus, one way to further increase efficiency and/or power of multicore processors may be to improve the energy efficiency of the cores.

SUMMARY

The present disclosure generally describes technologies for waved time multiplexing. Various examples of the described technologies may include systems, methods and/or devices (e.g., chips).

Some example methods described herein may operate a hybrid circuit-switched and packet-switched network-on-chip ("NOC"). Example methods may transmit a setup packet for requesting establishment of a circuit-switched path from a sender node on the NOC to a destination node on the NOC. The circuit-switched path may include one or more intermediate nodes arranged between the sender node and the destination node. When the setup packet traverses the intermediate nodes, each intermediate node can be configured to establish the circuit-switched path, to obtain one or more utilization rates of packet-switched traffic, and to append one or more of the utilization rates to the setup packet to form an appended setup packet. Example methods may receive the appended setup packet at the destination node. Upon receiving the appended setup packet at the destination node, example methods may select a primary utilization rate from the utilization rates, determine an interval period and a release duration based on the primary utilization rate, and generate an acknowledgement packet for confirming establishment of the circuit-switched path. The acknowledgement packet may include the interval period and the release duration. Example methods may transmit the acknowledgement packet along the circuit-switched path from the destination node to the sender node. The sender node may be configured to reserve router resources of the sender node for circuit-switched traffic during a use duration of the interval period and to release the router resources for packet-switched traffic during the release duration.

Various example methods may operate a hybrid circuit-switched and packet-switched NOC. Example methods may transmit a command flit from a sender node of the NOC to a destination node of the NOC via an intermediate node along a circuit-switched path. The command flit may include an interval period and a release duration. Upon transmitting the command flit, example methods may transmit one or more data flits from the sender node to the destination node via the intermediate node along the circuit-switched path. The sender node, the destination node, and the intermediate node may be configured to reserve router resources of the sender node, the destination node, and the intermediate node respectively for circuit-switched traffic during a use duration of the interval period and to release the router resources for packet-switched traffic during the release duration in a waved time multiplex arrangement.

Some example multicore chips (e.g., devices) may include a hybrid circuit-switched and packet-switched NOC. Example multicore chips may include a sender tile including a sender processor core, a sender cache memory, and a sender router of the NOC. Example multicore chips also may include at least one intermediate tile including an intermediate processor core, an intermediate cache memory, and an intermediate router of the NOC. Example multicore chips also may include a destination tile including a destination processor core, a destination cache memory, and a destination router of the NOC. The sender router may be configured to transmit to the destination router a setup packet for requesting establishment of a circuit-switched path including the intermediate router. The intermediate router may be configured to receive the setup packet, to establish the circuit-switched path, to obtain a utilization rate of packet-switched traffic of the intermediate router, and to append the utilization rate to the setup packet to form an appended setup packet. The destination router may be configured to receive the appended setup packet, to determine an interval period and a release duration of the interval period based on the utilization rate, to generate an acknowledgement packet for confirming the establishment of the circuit-switched path, and to transmit the acknowledgement packet to the sender router. The acknowledgement packet may include the interval period and the release duration. The sender router may be further configured to receive the acknowledgement packet, to reserve router resources of the sender router for circuit-switched traffic during an initiation of the interval period, and to release the router resources for packet-switched traffic during an initiation of the release duration.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

FIG. 8 is a schematic diagram illustrating computer program products for waved time multiplexing, all arranged according to at least some embodiments presented herein.

DETAILED DESCRIPTION

Figure 1:
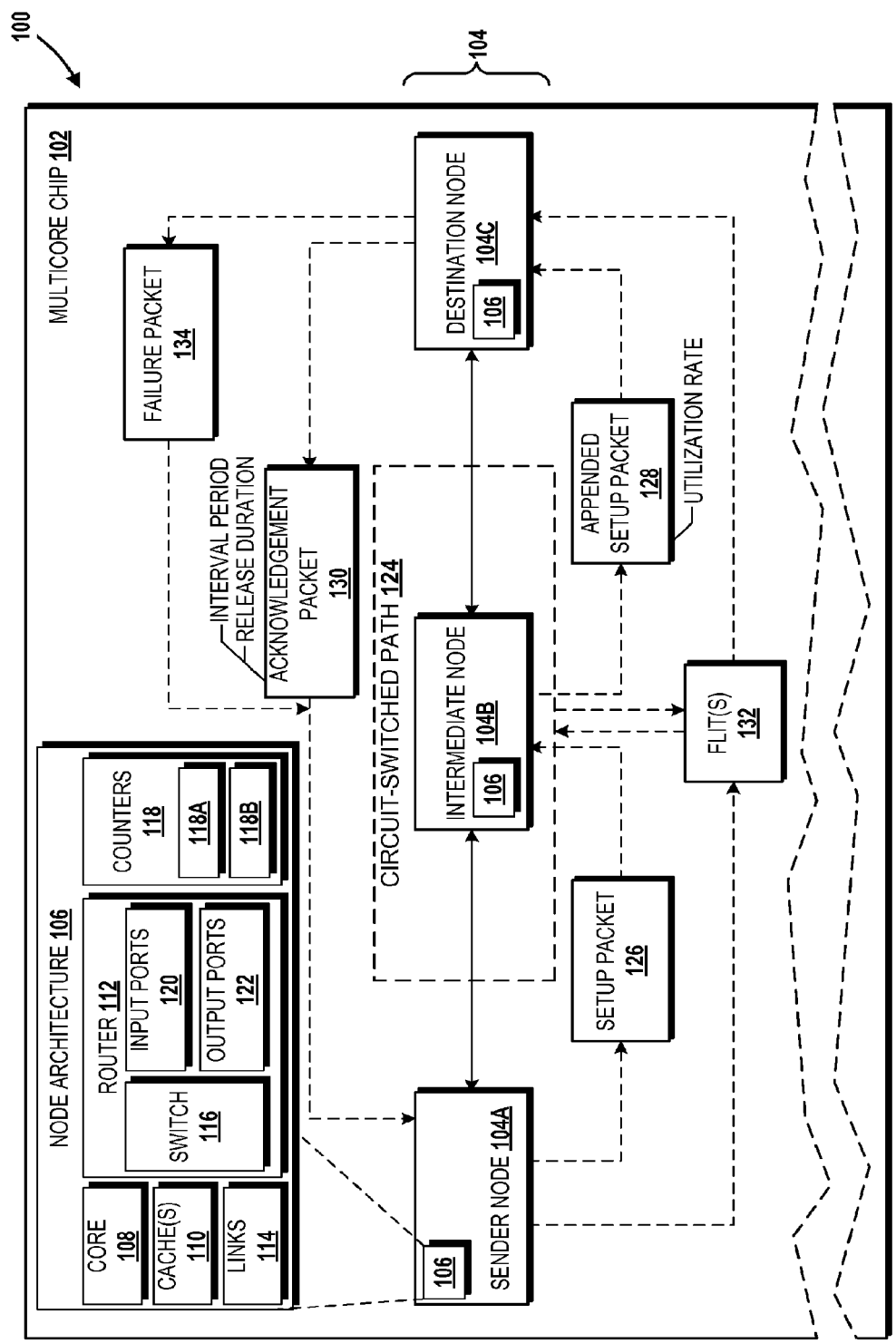
FIG. 1 is a block diagram illustrating an operating environment for various embodiments of the concepts and technologies disclosed herein for waved time multiplexing.

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies for waved time multiplexing. The various examples of the described technologies may be embodied in systems, methods and devices (e.g. chips).

In an illustrative example, nodes of a multicore chip network-on-chip ("NOC") can be adapted to employ the described techniques. For example, a NOC may include a sender node, one or more intermediate nodes, and a destination node. Each of the nodes can include a processor core ("core"), a cache memory ("cache"), and a router. The router can include one or more input ports and one or more output ports. The nodes also can include switches, links, and counters, if desired. The sender node can be configured to request establishment of a circuit-switched path. In some embodiments, the sender node may request establishment of the circuit-switched path by sending a setup packet to or toward the destination node.

The intermediate nodes can be configured to receive the setup packet, to establish a communication path between the input port and the output port of the router of the intermediate node. The intermediate node also can be configured to determine a utilization rate at the intermediate node. In some embodiments, the utilization rate can be determined as a maximum, an average, or an otherwise determined utilization rate based upon utilization rates determined for the input port and the output port at the intermediate node. The intermediate node can be further configured to concatenate or otherwise append the determined utilization rate to the setup packet, thereby forming an appended setup packet. The intermediate node can also be configured to forward the appended setup packet toward the destination node. Each intermediate node between the sender node and the destination node can also be configured to append a utilization rate to the appended setup packet before forwarding the appended setup packet to the destination node.

The destination node can be configured to receive the appended setup packet and to select a utilization rate based upon the one or more utilization rates appended to the appended setup packet. The destination node can select the utilization rate based upon an average of the multiple utilization rates, based upon application of a maximum ("MAX") function to the multiple utilization rates, or via other functions or mathematical processes applied to the multiple utilization rates. The destination node also can determine an interval period and a release duration to be used to support circuit-switched communications based upon the selected utilization rate. The interval period can correspond to and/or indicate a time or time unit that can be divided into a use duration and the release duration. The release duration can correspond to and/or indicate a period during which resources can be released for packet-switched traffic or other circuit-switched traffic. The use duration can correspond to and/or indicate a period during which the resources are reserved for circuit switched traffic. Thus, in some embodiments the interval period minus the release duration can correspond to the use duration.

The destination node can be configured to respond to the sender node with an acknowledgement packet indicating the successful setup of the circuit-switched communication path. If the setup fails for any reason, the destination node can instead send a failure packet to the sender node. Upon receiving the acknowledgement packet, the sender node can commence transmission of data to the destination node via the circuit-switched path. In some embodiments, packets corresponding to the data can be broken into multiple flits or other data portions. The flits can include a command flit that instructs the nodes along the circuit-switched path to begin implementing the circuit-switched session based upon an appended interval period and release duration. The flits also can include one or more data flits. If the data is sized small enough, the data and command may fit into a single command flit.

Nodes along the circuit-switched path can transmit the data using waved time multiplexing. Each resource along the path can transmit the data along the circuit-switched path during a use duration of the interval period and can be released for a release duration to handle other traffic such as packet-switched data or other circuit-switched data. After the interval period, the resources can be re-reserved for the circuit-switched traffic and transmission of the data via the circuit-switched path can continue. In some instances, if a circuit-switched path termination command is received, the connection may be terminated and resources may be released. These and other aspects of various concepts and technologies for waved time multiplexing will be described in more detail herein.

FIG. 1 is a block diagram illustrating an operating environment 100 for various embodiments of the concepts and technologies disclosed herein for waved time multiplexing, arranged in accordance with at least some embodiments presented herein. Although not labeled in FIG. 1, the operating environment 100 can be hosted within a computer system such as, for example, a personal computer ("PC"), a laptop computer, a tablet computer, a server computer, a set-top box ("STB") or set-top unit ("STU"), a mobile phone, a smartphone, a personal data assistant ("PDA"), an embedded control system, an in-vehicle computer system, other computing systems, or the like. For purposes of describing some embodiments of the concepts and technologies disclosed herein, the operating environment 100 may be described herein as being hosted by a server computer or a PC.

As shown in FIG. 1, the operating environment 100 can include at least one multicore processor or chip ("multicore chip") 102. Each of the multicore chips 102 can include a number of tiles, cores, or nodes ("nodes") 104. It should be appreciated that each multicore chip 102 can include less than three nodes 104, three nodes 104, or more than three nodes 104. A "node" or variants thereof, can be used herein to refer to a tile or node of the multicore chip 102 that can be configured to provide a NOC. As shown in FIG. 1, one or more, or each of the nodes 104 can include a node architecture 106. Although details of the node architecture 106 are illustrated only with respect to the sender node 104A, it should be understood that each of the nodes 104 can include the node architecture 106 and one or more components described herein with respect to the node architecture 106.

The node architecture 106 may include one or more cores 108, one or more caches 110, a router 112, links 114, and one or more counters 118. The router 112 can further include one or more switches 116, one or more input ports 120, and one or more output ports 122. The functionality of the counters 118 and the router 112 are described in additional detail below. Although not separately illustrated in FIG. 1, it should be understood that the core 108 may include control logic to control the functionality of the respective nodes 104, if desired. Alternatively, other control logic or control mechanisms can be utilized to control the functionality of the nodes 104 or the multicore chip 102, if desired.

As shown in FIG. 1, each of the nodes 104 can include the sender node 104A, one or more intermediate node(s) 104B, and one or more destination node(s) 104C. According to various embodiments of the concepts and technologies disclosed herein, the sender node 104A can be configured to request establishment of a circuit-switched communication path ("circuit-switched path") 124. The circuit-switched path 124 can be used by the nodes 104 to conduct circuit-switched communications within the multicore chip 102. As such, it can be understood that the nodes 104 can be configured to operate as a NOC, and that a communication path associated with the NOC can include the circuit-switched path 124. As will be explained in more detail below, the nodes 104 also can be configured to communicate using packet-switched communications in addition to, or instead of, the circuit-switched communications described herein. The packet-switched communications can occur via resources configured to operate as the circuit-switched path 124, if desired. As such, a packet-switched path can spatially intersect with the circuit-switched path 124 and therefore is not separately illustrated in FIG. 1.

According to some embodiments, the sender node 104A can be configured to generate a setup packet 126. The setup packet 126 can be generated by the sender node 104A to request establishment of the circuit-switched path 124. The sender node 104A can be configured to forward the setup packet 126 to the destination node 104C. The sender node 104A can forward the setup packet 126 to the destination node 104C via one or more of the intermediate nodes 104B.

The intermediate nodes 104B can be configured to receive the setup packet 126. In response to receiving the setup packet 126, the intermediate nodes 104B can be configured to establish a communication path through the intermediate nodes 104B, and to obtain utilization rates associated with the intermediate nodes 104B. The utilization rates can be obtained by analyzing, at the intermediate node 104B, a rate of traffic from the input port 120 to the output port 122 of the router 112 of the intermediate node 104B to determine a used capacity, e.g., a "utilization," of the router 112. Thus, the utilization rate can identify a used capacity associated with the intermediate node 104B. This utilization rate can be used to determine an amount of resources associated with the intermediate node 104B that can be made available to support circuit-switched communications via the intermediate node 104B, for example by subtracting the utilization rate from one. Example uses of the utilization rate are described in more detail below. The intermediate nodes 104B can be configured to concatenate or otherwise append the determined utilization rate to the setup packet 126 to generate an appended setup packet 128.

In some embodiments, the intermediate nodes 104B can be configured to concatenate the utilization rate to the setup packet 126 if the setup packet 126 is received at the intermediate nodes 104B. Additionally, or alternatively, if the setup packet 126 or the appended setup packet 128 is routed through multiple intermediate nodes 104B, one or more of the intermediate nodes 104B can concatenate a determined utilization rate to the setup packet 126 or the appended setup packet 128. Thus, the intermediate nodes 104B can be configured to append the utilization rate to the appended setup packet 128 if one or more other intermediate nodes 104B have already appended or concatenated utilization rates to the setup packet 126. As such, the appended setup packet 128 can include utilization rates for one or more intermediate nodes 104B between the sender node 104A and the destination node 104C.

In some other embodiments, the intermediate nodes 104B can be configured to selectively concatenate the utilization rate to the setup packet 126 if the setup packet 126 is received at the intermediate nodes 104B. As the setup packet 126 or an appended setup packet 128 traverses one of the intermediate nodes 104B, the intermediate node 104B can be configured to compare a utilization rate of the intermediate node 104B with a utilization rate included with and/or concatenated to the setup packet 126 or the appended setup packet 128. If the utilization rate of the intermediate node 104B differs from the utilization rate included with and/or concatenated to the setup packet 126 or the appended setup packet 128, the intermediate node 104B can be configured to replace the utilization rate included with and/or concatenated to the setup packet 126 or the appended setup packet 128 with the utilization rate of the intermediate node 104B.

Additionally, or alternatively, the intermediate node 104B can be configured to replace a utilization rate included with and/or concatenated to the setup packet 126 or the appended setup packet 128 with other calculated values such as, for example, an average utilization rate, a weighted average utilization rate, a median utilization rate, and/or other values that may be obtained from the setup packet 126 or the appended setup packet 128 or elsewhere. Thus, the intermediate nodes 104B may be configured to calculate the utilization rate and the setup packet 126 and/or the appended setup packet 128 may arrive at the destination node 104C with a calculated utilization rate. It should be understood that this embodiment is illustrative, and should not be construed as being limiting in any way.

Each intermediate node 104B also can be configured to forward the appended setup packet 128 toward the destination node 104C. Thus, the intermediate nodes 104B can be adapted to forward the appended setup packet 128 to or toward the destination node 104C each time a utilization rate is concatenated or otherwise appended to the setup packet 126 or the appended setup packet 128. After the appended setup packet 128 has traversed one or more of the intermediate nodes 104B, the appended setup packet 128 can be received at the destination node 104C.

Each destination node 104C can be configured to receive the appended setup packets 128, and to select, based upon contents of the appended setup packets 128, a utilization rate. If the appended setup packets 128 include a single utilization rate, for example, if a single intermediate node 104B appends a utilization rate to the setup packets 126, then each destination node 104C can be configured to select the single utilization rate as the utilization rate. If multiple intermediate nodes 104B have appended utilization rates to the setup packets 126 or the appended setup packets 128, then each destination node 104C can be configured to select a utilization rate based upon the multiple utilization rates appended to the appended setup packets 128.

In some embodiments, each of the destination nodes 104C can be configured to determine an average utilization rate based upon the multiple utilization rates appended to the appended setup packet 128. In some other embodiments, the destination nodes 104C can be configured to determine a maximum utilization rate based upon the multiple utilization rates appended to the appended setup packet 128. In some other embodiments, each of the destination nodes 104C can be configured to apply one or more mathematical functions to the multiple utilization rates appended to the appended setup packet 128 to select a utilization rate.

In some instances, each of the destination nodes 104C can be configured to determine the maximum utilization rate by applying a MAX function to the multiple utilization rates. In some embodiments, applying the MAX function to the utilization rates can provide a conservative value for the utilization rate by inherently preferring to avoid disturbing packet-switched traffic with circuit-switched traffic. In particular, because circuit-switched traffic can share resources with packet-switched traffic, a conservative value for the utilization rate may result in a smaller use duration for circuit switched traffic and a larger release duration for packet switched traffic. As such, applying the MAX function to provide a conservative value for the utilization rate can be used to prioritize resource use for packet-switched traffic. In some other instances, each of the destination nodes 104C can be configured to determine the average utilization rate by averaging the utilization rates appended to the appended setup packet 128. In some embodiments, the average utilization rate can be aggressive, relative to the maximum utilization rate, as the average function can be configured to reserve a larger utilization rate for circuit-switched traffic, thereby effectively penalizing some packet-switched traffic. The choice as to whether to use the average utilization rate, the maximum utilization rate, or a utilization rate selected using other functions or considerations, can be based upon user settings, configurations, or other considerations.

It further can be understood that when the appended setup packet 128 arrives at one or more the destination nodes 104C, the communication path between the sender node 104A and the destination nodes 104C will have been set up by the setup packet 126 or the appended setup packet 128. In particular, as the setup packet 126 and/or the appended setup packet 128 traverses a node 104, the setup packet 126 and/or the appended setup packet 128 can reserve resources of that node 104 for circuit-switched traffic. As such, the circuit-switched path 124 can be established via the setup packet 126 or the appended setup packet 128. Based upon the route and the determined utilization rates, one or more destination nodes 104C can be configured to determine a time multiplexing interval period ("interval period") P, a user duration for communications via the circuit-switched path 124, and/or a release duration R for other communications, including packet-switched communications. According to some embodiments, the destination nodes 104C can determine the interval period P, the use duration, and/or the release duration R as integer values. In some embodiments, R/P can be equal to the non-circuit-switched traffic allowed to occur via the circuit-switched path 124. In some other embodiments, R/P can be approximately equal to the utilization rate. According to some embodiments, interval period P and release duration R may be chosen from the current utilization rate as well as past utilization rates for the sender node 104A. The interval period P, the use duration, and the release duration R are described in more detail below.

In some examples, the interval period P can include an integer value that may represent a number of cycles for which one or more resources of the circuit-switched path 124 are to be reserved. In particular, as will be explained in more detail herein below, resources of the circuit-switched path 124 can be reserved and released in a waved or staggered manner. Thus, at a particular point in time, some resources of the circuit-switched path 124 may be reserved for circuit-switched communications, and some resources of the circuit-switched path 124 may be released for other communications such as packet-switched traffic. The interval period P therefore can correspond to a number of transmission cycles after which all resources of the circuit-switched path 124 are released. As used herein, a use duration can correspond to a portion of the interval period P during which a particular resource such as a particular node 104 or router 112 associated therewith can actively communicating circuit-switched traffic over the circuit-switched path 124.

The release duration R can include an integer value that can identify or otherwise correspond to a number of transmission cycles that are to be completed prior to release of particular resources along the circuit-switched path 124. Thus, it should be understood that an interval period P can include the release duration R. This will be more clearly understood below, particularly with reference to FIG. 6.

Briefly, if an interval period P is set to four cycles and a release duration R is set to two cycles, a particular resource may be reserved for circuit-switched traffic for two cycles and then may be released to handle other traffic. Another resource may be reserved for circuit-switched traffic for two cycles and then can be released to handle other traffic. Every four transmission cycles, in this example, all resources can be released and then reallocated for the circuit-switched traffic. This waved time multiplexing of the reservation and release of the resources can be repeated infinitely until the circuit-switched path 124 is terminated. Thus, the resource, and as such the multicore chip 102, can be configured as a hybrid NOC that supports circuit-switched traffic and packet-switched traffic over the same resource.

In some embodiments, the nodes 104 can be configured to track the number of transmission cycles that have occurred using respective counters 118. In some embodiments, each of the routers can share a clock signal. As such, in some embodiments of the multicore chip 102, the resources can be synchronously reserved or released in a waved manner. Thus, the counters 118 can be used to track the number of cycles to enforce the use duration, the interval period P, and/or the release duration R with respect to any particular resource along the circuit-switched path 124. Other approaches for enforcing the interval period P or the release duration R that do not use the counters 118 are possible and are contemplated.

In some embodiments, one or more of the nodes 104 can include multiple counters 118. A first one of the counters 118 can be set to a value corresponding to the difference of the interval period P minus the release duration R. In some embodiments, the result of the interval period P minus the release duration R can correspond to the use duration described above. A second one of the counters 118 can be set to a value corresponding to the release duration R. The one or more nodes 104 can be configured to reserve router resources of the nodes 104 for circuit-switched traffic during the use duration of the interval period P as indicated by first of the counters 118 and to release the router resources after the release duration R as indicated by the second of the counters 118. For each transmission cycle that occurs via the nodes 104, the first of the counters 118 can be decremented and the second of the counters 118 can be decremented after the first of the counters 118 reaches zero. The first of the counters 118 can be re-initiated after the second of the counters 118 reaches zero. Other methods for initializing values of the counters 118, for decrementing the counters 118, or re-initiating the counters 118 are possible and are contemplated.

The destination nodes 104C can be configured to generate an acknowledgement for transmission to the sender node 104A. The acknowledgement sent by the destination nodes 104C can be sent as the acknowledgement packet 130. The acknowledgement packet 130 can include the determined interval period P and the determined release duration R. The destination nodes 104C can further be configured to send the acknowledgement packet 130 to the sender node 104A as a response or reply to the appended setup packet 128.

The sender node 104A can be configured to receive the acknowledgement packet 130 from the destination nodes 104C. In response to the acknowledgement packet 130, the sender node 104A can be configured to begin using the established circuit-switched path 124 to transmit data to one or more destination nodes 104C. According to various embodiments, the sender node 104A can be configured to send the data to the destination nodes 104C as a data stream of one or more flits 132. The term "flit," as used herein, can be used to refer to a unit of data. Because other data can be sent as other types of data, it should be understood that this embodiment is illustrative, and should not be construed as being limiting in any way.

In some instances, the data transmitted from the sender node 104A to one or more destination nodes 104C can be represented in or as a single flit 132 or other data portion. In some other instances, the data transmitted from the sender node 104A to the destination nodes 104C may be represented by multiple flits 132. In either or both cases, the sender node 104A can be configured to begin transmitting the data over the circuit-switched path 124 by transmitting a command flit as a first of the flits 132. The command flit can specify the interval period P and the release duration R.

As the command flit is routed toward one or more destination nodes 104C, the command flit can be received and forwarded by each of the intermediate nodes 104B included in the circuit-switched path 124. The intermediate nodes 104B can parse from the command flit the interval period P and the release duration R. As such, each intermediate node 104B can determine, based upon the command flit, the time interval to use for time multiplexing. Thus, as the command flit travels along the circuit-switched path 124, the intermediate nodes 104B can start time multiplexing at a delay corresponding to the transmission delay. Because each of the intermediate nodes 104B can start the interval period P when the command flit traverses the intermediate node 104B, it should be understood that each of the intermediate nodes 104B may start at different clock cycles with respect to the time multiplexing of other intermediate nodes 104B. As such, each of the intermediate nodes 104B can be configured to time multiplex at a delay corresponding to the transmission delay at each of the intermediate nodes 104B. As such, each of the intermediate nodes 104B can operate based upon an interval period P applied using a counter 118 at each of the intermediate nodes 104B. As such, the command flit can be used by the sender node 104A to start the waved time multiplexing described herein at each of the intermediate nodes 104B.

After the command flit has traversed the circuit-switched path 124 or the intermediate nodes 104B, the communications over the circuit-switched path 124 can occur in a waved time multiplexed manner. Thus, the flits 132, which as mentioned above can include the command flit or can follow the command flit, may be transmitted over the circuit-switched path 124. Communication over the circuit-switched path is schematically illustrated below in FIG. 6. The communications over the circuit-switched path 124 can continue until the release duration R is met or satisfied, which may occur when a counter 118 decremented at one or more intermediate nodes 104B along the circuit-switched path 124 are decremented to zero. When the release duration R is met or satisfied, the resources used to provide the circuit-switched path 124, for example the routers 112 of the respective intermediate nodes 104B, may be released in a waved manner and packet-switched communications over these resources can resume. In some embodiments, a counter such as the counter 118A can be configured to count cycles of a user duration and a counter such as the counter 118B can be configured to count cycles of the release duration R. These counters 118A, 118B can be decremented for each transmission cycle. When the counter 118A and/or the counter 118B decrements to zero, the resources of the intermediate nodes 104B can be released. It should be understood that this embodiment is illustrative, and should not be construed as being limiting in any way.

In some instances, one or more destination nodes 104C may determine that the circuit-switched path 124 has not been or cannot be established. For example, the destination nodes 104C may determine that other nodes 104 already are using some or all resources of the desired circuit-switched path 124, or that for some other reason one or more of the nodes 104 is unable to set up the communication path. In response to such a determination or otherwise determining that the circuit-switched path 124 was not established, the destination nodes 104C can be configured to send a failure packet 134 to the sender node 104A. The destination nodes 104C can be configured to transmit the failure packet 134 via a packet-switched path, which can include some, all, or none of the resources at intermediate nodes that would have provided the circuit-switched path 124 had the circuit-switched path 124 been established. Thus, it can be understood that the resources of the nodes 104 can support circuit-switched or packet-switched communications. Upon receiving the failure packet 134, the sender node 104A can be configured to again attempt establishment of the circuit-switched path 124 or take other actions.

The operating environment 100 illustrated in FIG. 1 is illustrated as including one multicore chip 102, three nodes 104, and one circuit-switched path 124. It should be understood, however, that some implementations of the operating environment 100 may include multiple multicore chips 102, fewer than three, three, or more than three nodes 104, or multiple circuit-switched paths 124. As such, the various embodiments described herein should be understood as being illustrative of some examples of the operating environment 100, and should not be construed as being limiting in any way.

Figure 2:
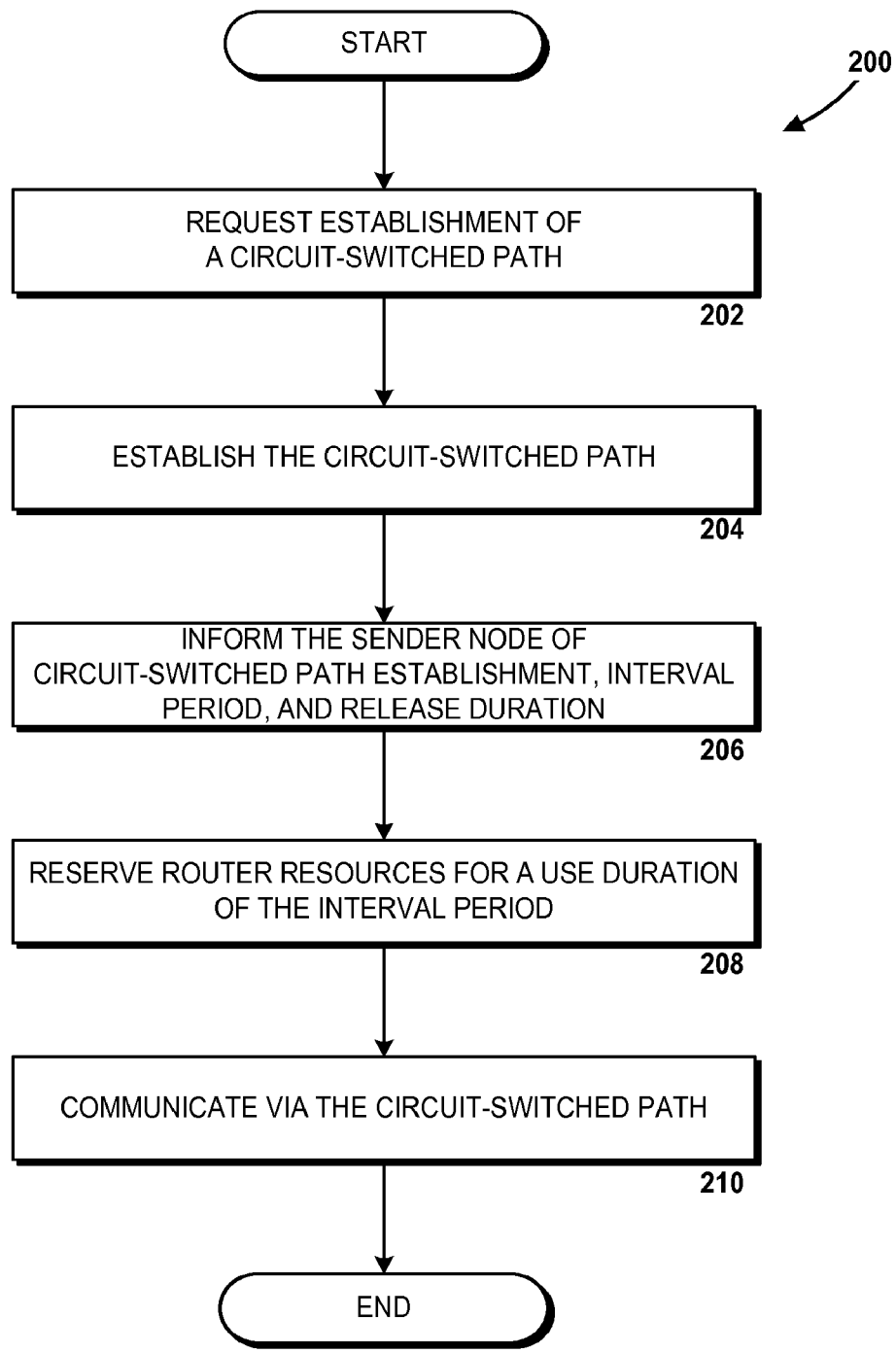
FIG. 2 is a flow diagram illustrating an example process for communicating using waved time multiplexing.

FIG. 2 is a flow diagram illustrating an example process 200 for communicating using waved time multiplexing, arranged in accordance with at least some embodiments presented herein. The process 200 may include various operations, functions, or actions as illustrated by one or more blocks 202-210.

The process 200 may begin at block 202 (Request Establishment of a Circuit-Switched Path), wherein one of the nodes 104, such as the sender node 104A, may be configured to request establishment of a circuit-switched path such as the circuit-switched path 124 illustrated in FIG. 1. In the embodiments illustrated and described above with reference to FIG. 1, the sender node 104A can request establishment of the circuit-switched path 124 by sending the setup packet 126 to or toward one or more destination nodes such as the destination nodes 104C.

As explained above with reference to FIG. 1, the setup packet 126 can be routed to one or more destination nodes 104C via one or more intermediate nodes 104B. The intermediate nodes 104B can be configured to receive the setup packet 126 and to determine a communication path through the intermediate node 104B in response to the setup packet 126. The communication path can include a determination of an input port and an output port associated with the intermediate node 104B. Additionally, the intermediate nodes 104B can be configured to determine a utilization rate and concatenate the utilization rate to the setup packet 126, thereby generating the appended setup packet 128. The intermediate nodes 104B can further be configured to forward the appended setup packet 128 toward or to the destination nodes 104C. In some embodiments, the appended setup packet 128 can be forwarded to the destination nodes 104C via one or more other intermediate nodes 104B. Block 202 may be followed by block 204.

At block 204 (Establish the Circuit-Switched Path), the circuit-switched path 124 may be established. Additional details of establishing the circuit-switched path 124 are set forth in detail below, particularly with reference to FIGS. 3-5. Briefly, the setup packet 126 may arrive at a first intermediate node 104B. The intermediate node 104B may configure a switch 116 of the intermediate node 104B to couple the requested input port with the requested output port. The intermediate node 104B can also be configured to determine a communication path through the intermediate node 104B, determine a utilization rate associate with the determined communication path, and append the determined utilization rate to the setup packet to generate an appended setup packet 128. The intermediate node 104B can be configured to forward the appended setup packet 128 to the next intermediate node 104B or to one or more destination nodes 104C if no additional intermediate nodes 104B exist.

Thus, when the appended setup packet 128 arrives at one or more destination nodes 104C, the appended setup packet 128 may have traversed the circuit-switched path 124 and may include utilization rates for one or more intermediate nodes 104B included in the circuit-switched path 124. Thus, the destination nodes 104C can be informed, by the appended setup packet 128, of the route of the circuit-switched path 124 and the utilization rates associated one or more nodes of the circuit-switched path 124. The destination nodes 104C also can be configured to determine an average, maximum, or other utilization rate based upon the utilization rates and an interval period P and release duration R based thereon. Thus, when the appended setup packet 128 arrives at the destination nodes 104C, the circuit-switched path 124 can be established. Block 204 may be followed by block 206.

At block 206 (Inform the Sender Node of Circuit-Switched Path Establishment, Interval Period, and Release Duration), wherein the sender node 104A may be informed that the circuit-switched path 124 has been established. According to various embodiments, one or more destination nodes 104C can be configured to send an acknowledgement packet 130 to the sender node 104A. As mentioned above, the destination nodes 104C can be configured to include in the acknowledgement packet 130 identification of the interval period P and the release duration R. Receipt of the acknowledgement packet 130 at the sender node 104A can effectively indicate that the circuit-switched path 124 has been established. Block 206 may be followed by block 208.

At block 208 (Reserve Router Resources for a Use Duration of the Interval Period), wherein the sender node 104A can be configured to reserve router resources associated with the intermediate nodes 104B that are included in the circuit-switched path 124 to support communications via the circuit-switched path 124. In reserving the resources, the sender node 104A can be configured to reserve the resources for a use duration of the interval period P. The phrase "use duration" and variants thereof can be used herein to refer to a period of time between transmissions of the flits 132 or a number of cycles or transmissions of the flits 132. As explained in more detail below, the flits 132 can be transmitted in a staggered or waved manner such that the flits 132 can pass through the intermediate nodes 104B without or with minimized blocking of one another or other communications occurring via the reserved resources. Block 208 may be followed by block 210.

At block 210 (Communicate via the Circuit-Switched Path), wherein the sender node 104A can be configured to communicate with one or more destination nodes 104C via the circuit-switched path 124. As mentioned above with reference to block 208, the communications occurring over the circuit-switched path 124 can be transmitted using a waved time multiplexing approach. The waved time multiplexing of the transmitted flits 132 is illustrated and described below in more detail, particularly with reference to FIG. 6. After block 210, the process 200 may repeat (e.g., periodically, continuously, or on-demand) or terminate.

Figure 3:
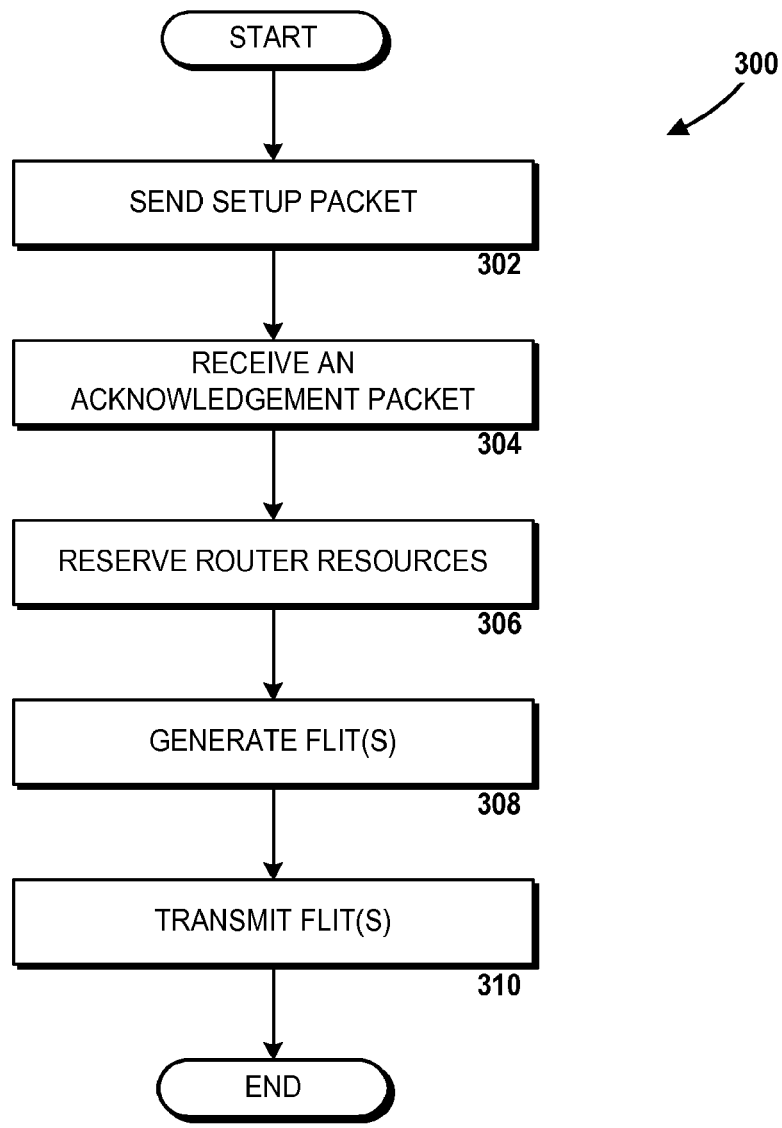
FIG. 3 is a flow diagram illustrating additional aspects of an example process for waved time multiplexing.

FIG. 3 is a flow diagram illustrating additional aspects of an example process 300 for waved time multiplexing, arranged in accordance with at least some embodiments presented herein. In particular, FIG. 3 illustrates some operations that can occur at the sender node 104A during circuit-switched communications setup and communication via the circuit-switched path 124. The process 300 may include various operations, functions, or actions as illustrated by one or more blocks 302-310.

The process 300 may begin at block 302 (Send Setup Packet), wherein the sender node 104A can be configured to send a setup packet 126. As explained above, the sender node 104A can be configured to forward the setup packet 126 to one or more destination nodes 104C via one or more intermediate nodes 104B. As such, the sender node 104A can be configured to forward the setup packet 126 to the destination nodes 104C or to send the setup packet 126 to a first intermediate node 104B between the sender node 104A and the destination nodes 104C. Block 302 may be followed by block 304.

At block 304 (Receive an Acknowledgement Packet), the sender node 104A can be configured to receive an acknowledgement packet, such as the acknowledgement packet 130, from one or more destination nodes 104C. Although not shown in FIG. 3, it should be understood that the destination nodes 104C can be configured to receive the appended setup packet 128 from the intermediate node 104B, and to generate the acknowledgement packet 130 as a response to the appended setup packet 128. Some operations that can occur at the destination nodes 104C for receiving the appended setup packet 128 and responding to the appended setup packet 128 with the acknowledgement packet 130 are illustrated and described below in additional detail with reference to FIGS. 4-6. Block 304 may be followed by block 306.

At block 306 (Reserve Router Resources), the sender node 104A can be configured to reserve router resources in response to receiving the acknowledgement packet 130. According to various embodiments, the sender node 104A can be configured to reserve resources associated with the multiple nodes 104 of the circuit-switched path 124 for the use duration of the interval period P and to release the resources for the release duration R. According to some embodiments, the resources of the intermediate nodes 104B such as the routers 112 of the intermediate nodes 104B can be reserved during the use duration of the interval period P to support circuit-switched communications over the circuit-switched path 124 and to release the resources for the release duration to allow packet-switched communications or other communications to occur via the reserved resources.

According to some embodiments of the concepts and technologies disclosed herein, the resources associated with the circuit-switched path 124 can be reserved for a particular number of cycles or transmissions of the flits 132. According to some implementations, the sender node 104A can be configured to reserve the resources along the circuit-switched path 124 for a specified number of cycles, after which the circuit-switched path 124 can be released, dismantled, or terminated. As such, the sender node 104A can be configured to specify a number of cycles for which the circuit-switched path 124 is to persist during the communications, if desired. Block 306 may be followed by block 308.

At block 308 (Generate Flit(s)), the sender node 104A can be configured to generate one or more flits 132. In some instances, the data to be communicated from the sender node 104A to one or more destination nodes 104C can fit into a single flit 132, and in some other instances, multiple flits 132 may be used. As mentioned above, in cases in which multiple flits 132 are to be transmitted, the sender node 104A can be configured to send a command flit ahead of data flits or other flits 132. As such, block 308 can include one or more operations adapted to divide or break the data to be communicated from the sender node 104A to the destination nodes 104C into a number of the flits 132. Block 308 may be followed by block 310.

At block 310 (Transmit Flit(s)), the sender node 104A can be configured to transmit the one or more flits 132 generated in block 308 over the circuit-switched path 124 to the one or more destination nodes 104C. It should be understood that the flits 132 can be generated at times other than at block 308, if desired. After block 310, the process 300 may repeat (e.g., periodically, continuously, or on-demand) or terminate.

Figure 4:
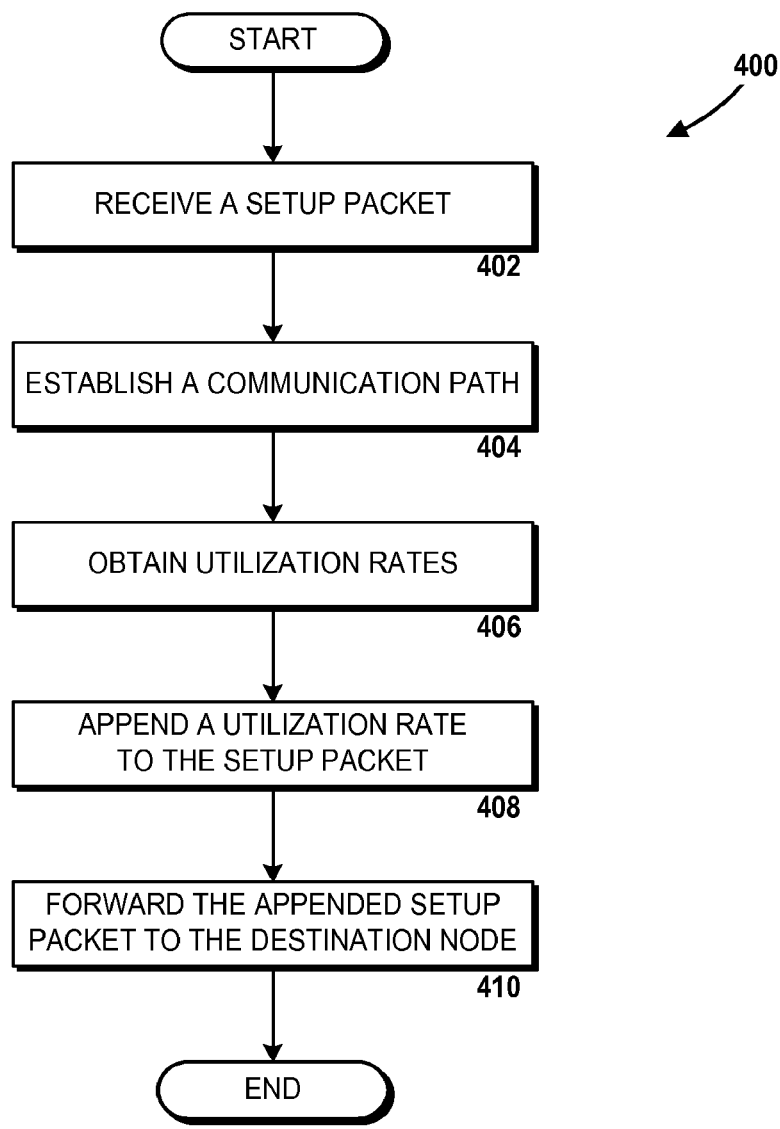
FIG. 4 is a flow diagram illustrating additional aspects of an example process for waved time multiplexing.

FIG. 4 is a flow diagram illustrating additional aspects of an example process for waved time multiplexing, arranged in accordance with at least some embodiments presented herein. In particular, FIG. 4 illustrates some operations that can occur at one or more of the intermediate nodes 104B during circuit-switched communications setup and during communications via the circuit-switched path 124. The process 400 may include various operations, functions, or actions as illustrated by one or more blocks 402-410.

The process 400 may begin at block 402 (Receive a Setup Packet), wherein the intermediate node 104B can be configured to receive the setup packet 126. It should be understood that that the setup packet 126 received in block 402 can be, but is not necessarily, the setup packet 126 described in block 302 above.

In some other embodiments, the process 400 can be repeated at each of multiple intermediate nodes 104B between the sender node 104A and the destination node 104C. As such, if the intermediate node 104B receiving the setup packet in block 402 is a second or subsequent intermediate node 104B, then the setup packet received in block 402 can correspond to the appended setup packet 128 described above in detail. Block 402 may be followed by block 404.

At block 404 (Establish a Communication Path), the intermediate node 104B can be configured to establish a communication path through the intermediate node 104B. Establishment of the communication path can include identifying an input port associated with the intermediate node 104B and an output port associated with the intermediate node 104B. This communication path therefore can include at least a portion of the circuit-switched path 124 described herein. According to some embodiments, the intermediate node 104B can be configured to establish the communication path by coupling the identified input port associated with the intermediate node 104B with the output port. Block 404 may be followed by block 406.

At block 406 (Obtain Utilization Rates), the intermediate node 104B can be configured to obtain utilization rates of packet-switched traffic at the intermediate node 104B. As such, the utilization rates can correspond to traffic rates through the intermediate node 104B and therefore can be considered as being equivalent to anticipated traffic rates across the intermediate node 104B. Block 406 may be followed by block 408.

At block 408 (Append a Utilization Rate to the Setup Packet), the intermediate node 104B can be configured to concatenate or otherwise append an obtained utilization rate to the setup packet 126 or appended setup packet 128 received in block 402. Thus, as mentioned above, the appended setup packet 128 can be generated in block 408 or a utilization rate can be appended to the appended setup packet 128 via concatenation or other approaches, if desired. Because each intermediate node 104B associated with a circuit-switched path 124 can concatenate a utilization rate to the setup packet 126 or the appended setup packet 128, the appended setup packet 128 can include multiple utilization rates when the appended setup packet 128 eventually arrives at the destination node 104C. It should be understood that "appending" the utilization rate as described herein can further include comparing a utilization rate at the intermediate node 104B to a utilization rate appended to or associated with the setup packet 126 or the appended setup packet 128. As explained above, the intermediate nodes 104B can be configured to average one or more utilization rates appended to the setup packet 126 or the appended setup packet 128, replace one or more utilization rates appended to the setup packet 126 or the appended setup packet 128, and/or otherwise select, average, weight, or replace utilization rates associated with the setup packet 126 and/or the appended setup packet 128. Block 408 may be followed by block 410.

At block 410 (Forward the Appended Setup Packet to the Destination Node), the intermediate node 104B can be configured to send or forward the appended setup packet 128 to one or more destination nodes 104C. As used herein, the term "forward" can be used to refer to the appended setup packet 128 being sent toward the destination nodes 104C. As mentioned above, the appended setup packet 128 can be sent toward the destination nodes 104C or sent to the destination nodes 104C, depending upon whether additional intermediate nodes 104B exist. After block 410, the process 400 may repeat (e.g., periodically, continuously, or on-demand) or terminate.

Figure 5:
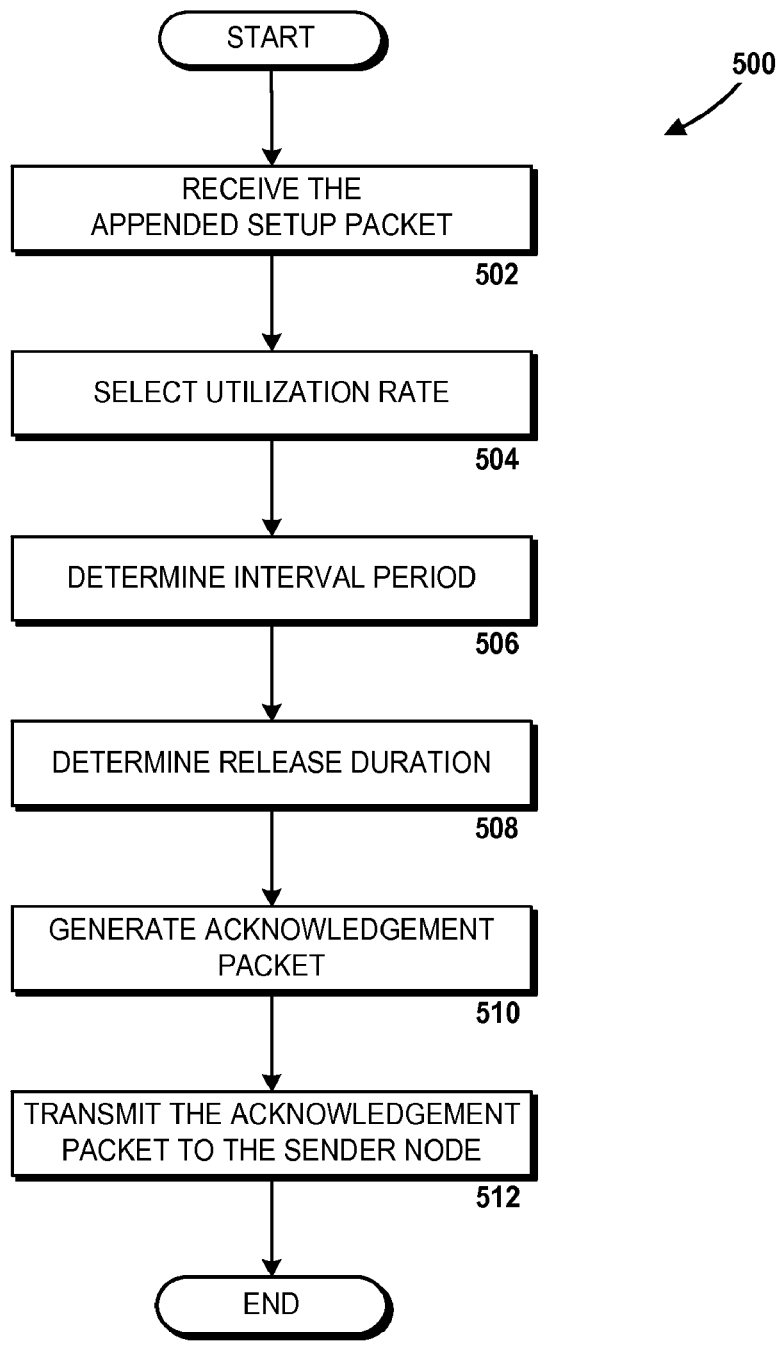
FIG. 5 is a flow diagram illustrating additional aspects of an example process for waved time multiplexing.

FIG. 5 is a flow diagram illustrating additional aspects of an example process 500 for waved time multiplexing, arranged in accordance with at least some embodiments presented herein. In particular, FIG. 5 illustrates some operations that can occur at the destination nodes 104C during circuit-switched communications setup and communication via the circuit-switched path 124. The process 500 may include various operations, functions, or actions as illustrated by one or more blocks 502-512.

The process 500 may begin at block 502 (Receive the Appended Setup Packet), wherein the destination node 104C can be configured to receive the appended setup packet 128. As explained above, the appended setup packet 128 can include, encoded therein, utilization rates associated with each intermediate node 104B between the sender node 104A and the one or more destination nodes 104C. As such, it can be appreciated that the appended setup packet 128 received in block 502 can be similar or even identical to the appended setup packet 128 forwarded by the intermediate node 104B in block 410 of the process 400 illustrated in FIG. 4. Block 502 may be followed by block 504.

At block 504 (Select Utilization Rate), one or more destination nodes 104C can be configured to select a utilization rate included in the appended setup packet 128. As explained above, each of the intermediate nodes 104B can concatenate a utilization rate to the setup packet 126 or the appended setup packet 128. Thus, the appended setup packet 128 can include multiple utilization rates and each of the destination nodes 104C can select a utilization rate from the multiple utilization rates or determine a utilization rate based upon the multiple utilization rates.

In some embodiments, each of the one or more destination nodes 104C can be configured to select a utilization rate by averaging multiple utilization rates included in the appended setup packet 128. In some other embodiments, each of the destination nodes 104C can be configured to select a utilization rate by applying a MAX function to the multiple utilization rates included in the appended setup packet 128. In some other embodiments, each of the destination nodes 104C can be configured to select a utilization rate by applying other mathematical functions to multiple utilization rates included in the appended setup packet 128. In some other embodiments, each of the destination nodes 104C can be configured to select a utilization rate by determining that a single utilization rate is included in the appended setup packet 128 and selecting that utilization rate. Other approaches for determining or selecting utilization rates based upon utilization rates included in the appended setup packet 128 are possible and are contemplated. Block 504 may be followed by block 506.

At block 506 (Determine Interval Period), one or more destination nodes 104C can be configured to determine the interval period P based, at least partially, upon the selected or determined utilization rate. The interval period P can include an integer value that defines a number of data transmission cycles for which resources along the circuit-switched path 124 can be reserved for circuit-switched communications. According to various embodiments, the resources along the circuit-switched path 124 can include various components of the node architecture 106 described hereinabove with reference to FIG. 1. As such, the resources reserved along the circuit-switched path 124 can include, but are not limited to, cores 108, caches 110, routers 112, links 114, switches 116, and/or counters 118 of the respective nodes 104 along the circuit-switched path 124. As mentioned above, a particular resource may carry non-circuit-switched traffic during the release duration and may carry circuit-switched traffic only during a use duration. After the interval period P, a particular resource may be again reserved for the circuit-switched traffic. Thus, the interval period P can include the user duration and the release duration of the particular resource. During the use duration, the resource may handle circuit-switched traffic, and during the release duration, the resource may handle non-circuit-switched traffic or at least may not be dedicated to the circuit-switched traffic. Block 506 may be followed by block 508.

At block 508 (Determine Release Duration), the destination node 104C can be configured to determine a release duration R. The release duration R can correspond to a number of cycles during an interval period P during which a resource can be released or not dedicated to the circuit-switched traffic. Thus, the release duration R can correspond to the interval period P minus the use duration. Similarly, the use duration of a resource can correspond to an interval period P minus the release duration R. The release duration R and interval period P may be chosen such that a ratio of the release duration R to the interval period P (e.g., R/P), or other functions or values based at least partially upon a ratio of the release duration R to the interval period P, can be equal to the selected utilization rate. The relationship between the interval period P and the release duration R may be more clearly understood with reference to FIG. 6 below. Block 508 may be followed by block 510.

At block 510 (Generate Acknowledgement Packet), the destination node 104C can be configured to generate the acknowledgement packet 130. The acknowledgement packet 130 can be a data packet or flit adapted to confirm establishment of the circuit-switched path 124. In some embodiments, the destination node 104C can be configured to include, as part of the acknowledgement packet 130, the determined interval period P and the determined release duration R. Block 510 may be followed by block 512.

At block 512 (Transmit the Acknowledgement Packet to the Sender Node), one or more destination nodes 104C can be configured to transmit the acknowledgement packet 130 to the sender node 104A. According to some embodiments, the destination nodes 104C can be configured to forward the acknowledgement packet 130 to the sender node 104A via the circuit-switched path 124. In some other embodiments, the destination nodes 104C can be configured to transmit or forward the acknowledgement packet 130 to the sender node 104A via other communication paths such as a packet-switched communication path. After block 512, the process 500 may repeat (e.g., periodically, continuously, or on-demand) or terminate.

Figure 6:
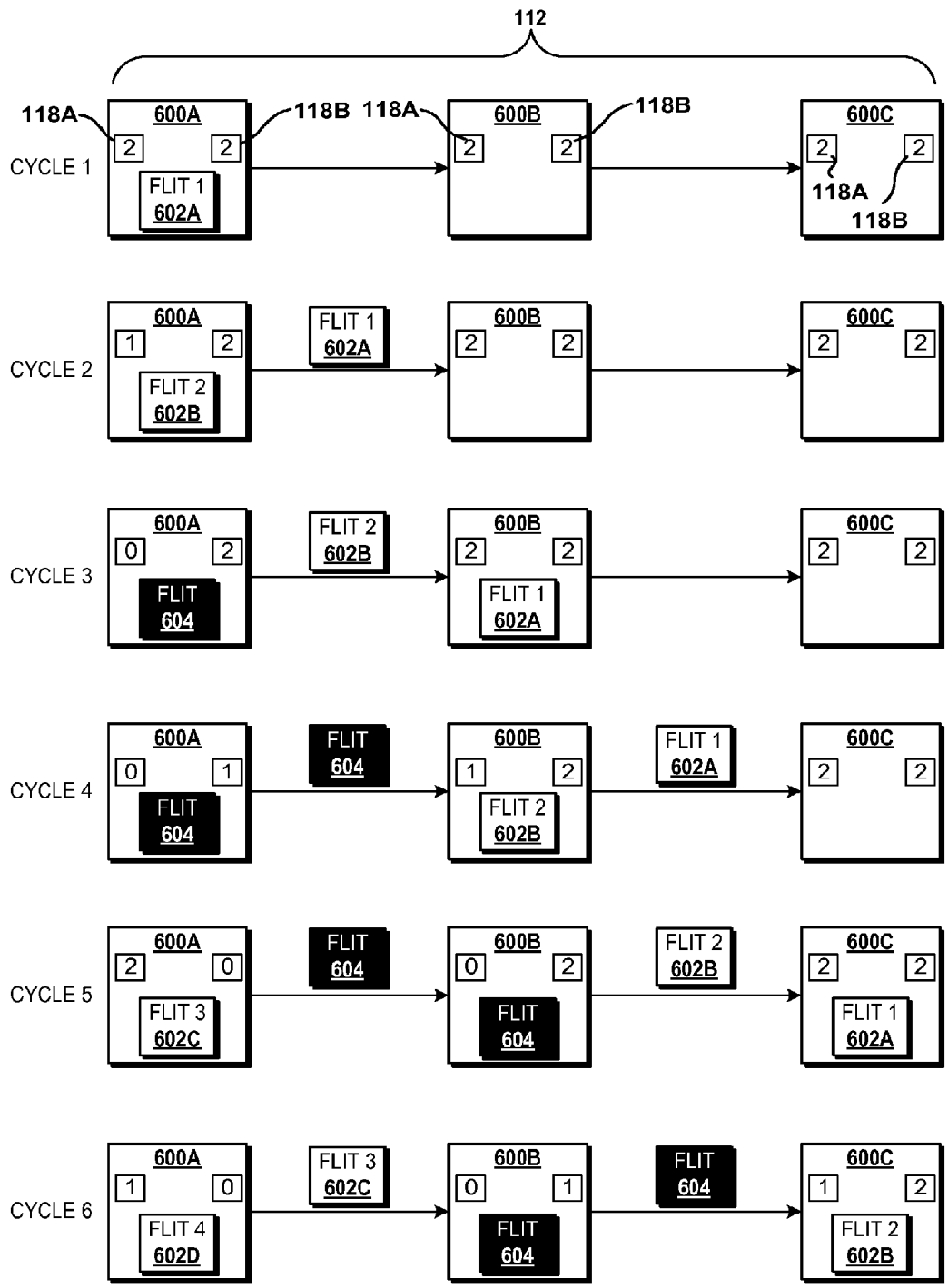
FIG. 6 is a block diagram illustrating additional aspects of the waved time multiplexing described herein.

FIG. 6 is a block diagram illustrating additional aspects of the waved time multiplexing described herein, arranged in accordance with at least some embodiments presented herein. Six transmission cycles are shown, labeled "CYCLE 1" through "CYCLE 6." As shown, a number of nodes 600A-600C (hereinafter collectively or generically referred to as "nodes 600") can be configured to cooperatively transmit data over the circuit-switched path 124 in a waved time multiplexed manner as described herein. It should be understood that the illustrated nodes 600 can, but do not necessarily, correspond to the nodes 104 illustrated in FIG. 1. As such, the nodes 600 can include or correspond to the sender node 104A, the intermediate node 104B, and one or more destination nodes such as the destination node 104C illustrated and described above with reference to FIG. 1. In some other embodiments, the nodes 600 shown in FIG. 6 can correspond to three intermediate nodes 104B. In some other embodiments, the nodes 600 shown in FIG. 6 can include multiple intermediate nodes 104B and the sender node 104A or the destination nodes 104C. For purposes of describing the concepts and technologies disclosed herein, the nodes 600 are described in FIG. 6 as corresponding to three intermediate nodes 104B.

For purposes of illustrating and describing various embodiments of the concepts and technologies disclosed herein, four flits 602A-602D are illustrated in FIG. 6. The flits 602A-602D can, but do not necessarily, correspond to the flits 132 illustrated and described above. The flits 602A-602D have been labeled "FLIT 1" through "FLIT 4" for ease of description. According to various embodiments, a first of flits 602A-602D, FLIT 1 602A, can correspond to a command flit as described above with reference to FIGS. 1-5. In other embodiments, the command flit can be sent at any time, including in one or more transmission cycles not illustrated in FIG. 6.

For purposes of illustrating and describing the embodiment shown in FIG. 6, an interval period P of four cycles and a release duration R of two cycles are assumed. In the first cycle, CYCLE 1, the first flit 602A labeled FLIT 1 is illustrated as having arrived at the first intermediate node 600A. In the second cycle, CYCLE 2, the first flit 602A has been forwarded by the first intermediate node 600A toward the second intermediate node 600B, and the second flit 602B labeled "FLIT 2" has arrived at the first intermediate node 600A.

As noted above, the release duration R will have been satisfied after two transmission cycles occur at a particular intermediate node 600. Thus, resources dedicated to the circuit-switched traffic at the intermediate node 600A can be released to accommodate packet-switched traffic or other non-circuit-switched traffic. This is illustrated in the third cycle, CYCLE 3, with arrival of a flit associated with non-circuit-switched traffic ("non-circuit-switched traffic flit") 604 at the first intermediate node 600A. The non-circuit-switched traffic flits 604 are illustrated in FIG. 6 as black squares for ease of description. It should be noted that the resources associated with the second intermediate node 600B have not yet been released in CYCLE 3 because the second intermediate node 600B has not yet completed two transmission cycles. In particular, in CYCLE 3, only the first flit 602A has traversed the intermediate node 600B, and as such, the release duration R has not been satisfied at the second intermediate node 600B.

It can be appreciated with reference to the fourth cycle, CYCLE 4, that resources associated with the first intermediate node 600A still can be released to accommodate the non-circuit-switched traffic, but that the downstream nodes 600B and 600C still can be reserved to provide transmission of the circuit-switched traffic such as the flits 602A-602B. In a fifth cycle, CYCLE 5, the second intermediate node 600B can release its resources as the release duration R has been satisfied at the second intermediate node 600B. Meanwhile, the first intermediate node 600A can again reserve resources for circuit-switched traffic since four cycles have now been completed, and the interval period therefore is now satisfied. Thus, as shown, a third flit 602C has arrived at the first intermediate node 600A. It therefore can be understood with reference to FIG. 6 that circuit-switched traffic can begin traversing the circuit-switched path 124 while non-circuit-switched traffic may also be using some resources of nodes that are included the circuit-switched path 124.

The waved time multiplexing approach described herein can include reserving and releasing resources associated with the intermediate nodes 104B such as the nodes 600A-600C in a waved manner so that traffic carrying capacity of the circuit-switched path 124 can be maximized. Thus, the circuit-switched traffic need not complete transmission across the circuit-switched path 124 prior to releasing some resources associated with the circuit-switched path 124. Similarly, non-circuit-switched traffic need not be completed prior to reserving the resources of the circuit-switched path 124 for circuit-switched traffic again. It should be understood that the embodiments described herein are illustrative, and should not be construed as being limiting in any way. As can be appreciated from the below TABLE 1, resources of the nodes 600 can carry traffic during particular use duration cycles and/or can release resources at particular release duration cycles. Resources of the nodes 600 may be unused prior to the arrival of the command flit, as shown in TABLE 1. It should be understood that the contents of TABLE 1 illustrated below are illustrative of the example shown in FIG. 6 and therefore should not be construed as being limiting in any way.

TABLE 1

| Node | Unused Duration | Cycles of Use Duration | Cycles of Release Duration |
|---|---|---|---|
| 600A | — | 1, 2, 5, 6 | 3, 4 |
| 600B | 1, 2 | 3, 4 | 5, 6 |
| 600C | 1, 2, 3, 4 | 5, 6 | — |

Additionally, as explained above and shown in FIG. 6, each of the nodes 600A-600C can maintain one or more counters 118 for tracking the use duration and/or the release duration cycles. Thus, for example, a respective first counter 118A of each of the nodes 600A-600C can be set by the command flit 602A to track the use duration of the respective nodes 600A-600C. In FIG. 6, the first counters 118A of respective nodes 600A-600C can be set to two, corresponding to two cycles of circuit-switched traffic. Similarly, a respective second counter 118B of each of the nodes 600A-600C can be set by the command flit 602A to track the release duration of the respective nodes 600A-600C. In FIG. 6, the second counters 118B of respective nodes 600A-600C can be set to two, corresponding to two cycles of non-circuit-switched traffic. As the flits 602 traverse the nodes 600A-600C, the counters 118 can be decremented by one, and when the counters 118 reach zero, the resources associated with the nodes 600A-600C can be released. As shown in FIG. 6, the values of these counters can be decremented at each cycle. Values for counters 118 are shown in FIG. 6. Because the values of these counters can be set to any desired value and/or because the counters 118 can be configured to count other durations and/or cycles, it should be understood that this embodiment is illustrative, and should not be construed as being limiting in any way.

Figure 7:
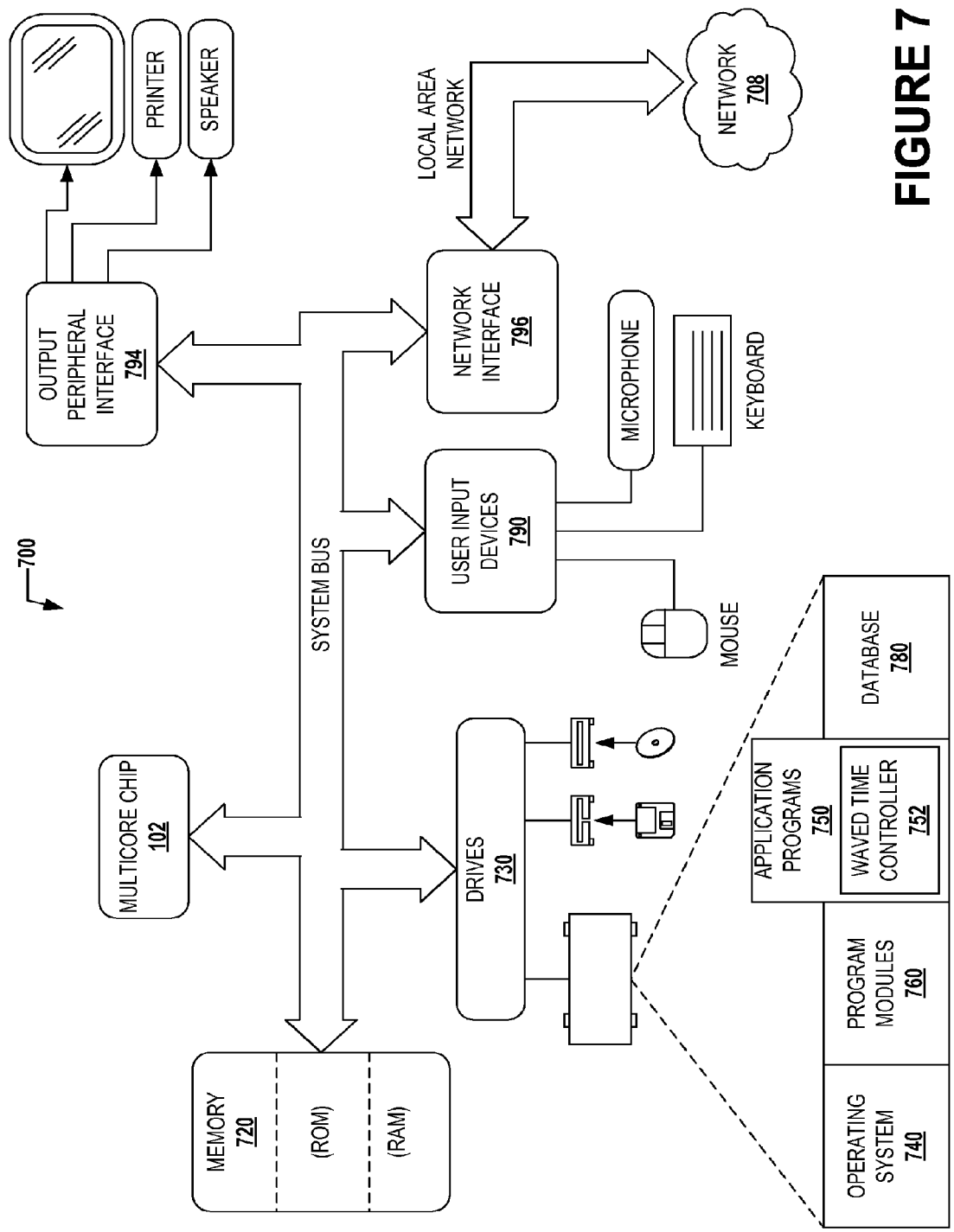
FIG. 7 is a block diagram illustrating an example computer capable of providing an operating environment for various embodiments described herein.
Figure 7:
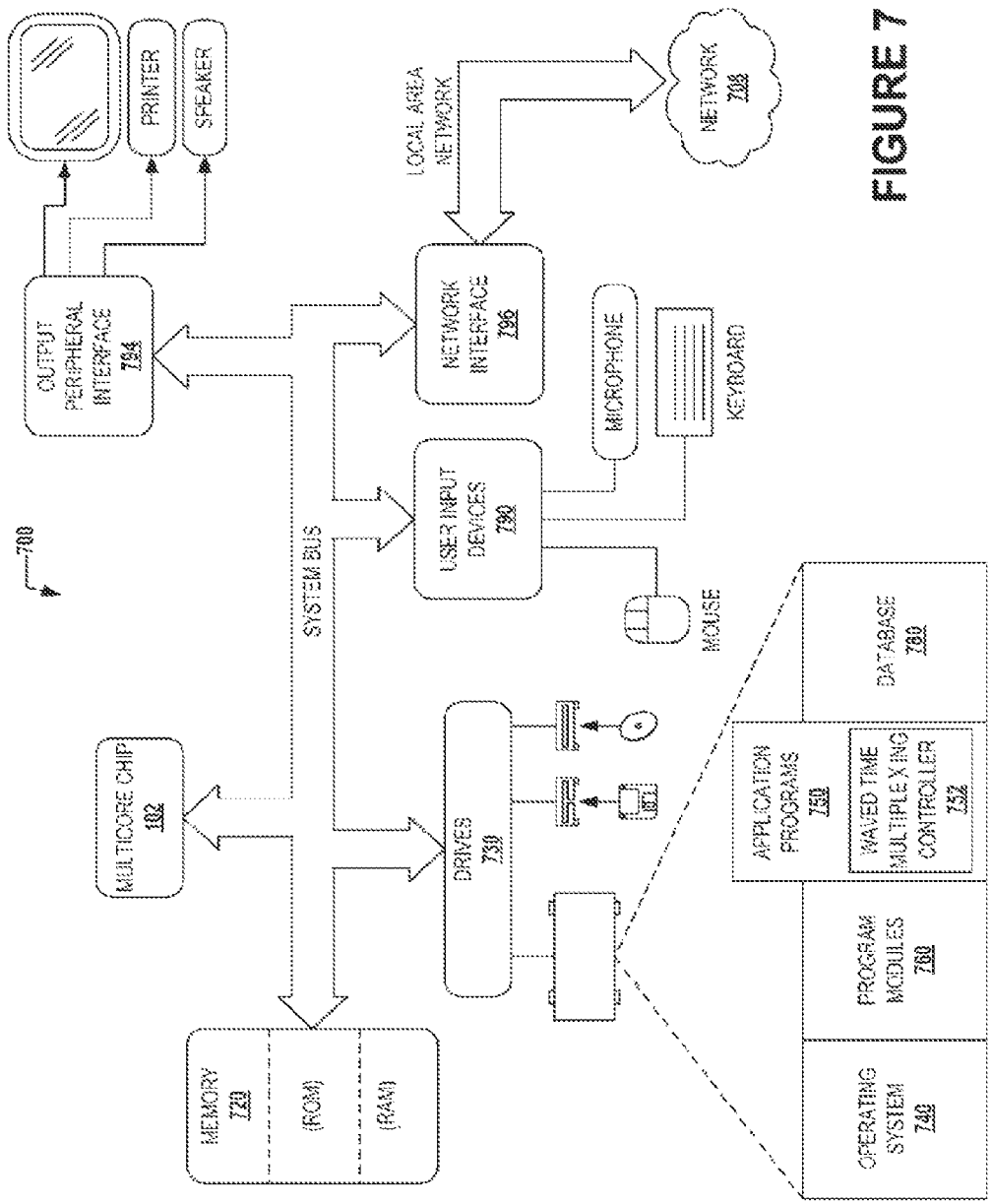

FIG. 7 is a block diagram illustrating an example computer 700 capable of providing an operating environment for various embodiments described herein, arranged in accordance with at least some embodiments presented herein. As depicted, the computer 700 includes the multicore chip 102, a memory 720 and one or more drives 730. The computer 700 may be implemented as a conventional computer system, an embedded control computer, a laptop, or a server computer, a mobile device, an STB, an STU, a vehicular information system, a mobile telephone or smartphone, or other hardware platform.

The drives 730 and their associated computer storage media, provide storage of computer readable instructions, data structures, program modules and other data for the computer 700. The drives 730 can include an operating system 740, application programs 750, program modules 760, and a database 780. The program modules 760 may include various controllers, such as a waved time multiplexing controller 752, or other functionality adapted to execute any or all of the processes 200, 300, 400, or 500 for waved time multiplexing as described in greater detail above (e.g., see previous description with respect to one or more of FIGS. 1-6). The computer 700 further includes user input devices 790 through which a user may enter commands and data. The input devices 790 can include one or more of an electronic digitizer, a microphone, a keyboard and pointing device, commonly referred to as a mouse, trackball or touch pad. Other input devices may include a joystick, game pad, satellite dish, scanner, other devices, or the like.

These and other input devices can be coupled to the processor 710 through a user input interface that is coupled to a system bus, but may be coupled by other interface and bus structures, such as a parallel port, game port or a universal serial bus ("USB"). Computers such as the computer 700 also may include other peripheral output devices such as speakers, printers, displays, and/or other devices, which may be coupled through an output peripheral interface 794 or the like.

The computer 700 may operate in a networked environment using logical connections to one or more computers, such as a remote computer (not illustrated), and/or other devices operating as part of or in communication with a network 708 coupled to a network interface 796. The remote computer may be a personal computer, a server, a router, a network PC, a peer device or other common network node, and can include many or all of the elements described above relative to the computer 700. Networking environments are commonplace in offices, enterprise-wide area networks ("WAN"), local area networks ("LAN"), intranets, and the Internet.

When used in a LAN or WLAN networking environment, the computer 700 may be coupled to the LAN through the network interface 796 or an adapter. When used in a WAN networking environment, the computer 700 typically includes a modem or other means for establishing communications over the WAN, such as the Internet or the network 708. The WAN may include the Internet, the illustrated network 708, various other networks, or any combination thereof. It will be appreciated that other mechanisms of establishing a communications link, ring, mesh, bus, cloud, or network between the computers may be used.

According to some embodiments, the computer 700 may be coupled to a networking environment. The computer 700 may include one or more instances of a physical computer-readable storage medium or media associated with the drives 730 or other storage devices. The system bus may enable the processor 710 to read code and/or data to/from the computer storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 720, whether characterized as RAM, ROM, flash, or other types of volatile or nonvolatile memory technology. The media may also represent secondary storage, whether implemented as the storage drives 730 or otherwise. Hard drive implementations may be characterized as solid state, or may include rotating media storing magnetically-encoded information.

The storage media may include one or more program modules 760. The program modules 760 may include software instructions that, when loaded into the processor 710 and executed, transform a general-purpose computing system into a special-purpose computing system. As detailed throughout this description, the program modules 760 may provide various tools or techniques by which the computer 700 may participate within the overall systems or operating environments using the components, logic flows, and/or data structures discussed herein.

The processor 710 may be constructed from any number of transistors or other circuit elements, which may individually or collectively assume any number of states. More specifically, the processor 710 may operate as a state machine or finite-state machine. Such a machine may be transformed to a second machine, or specific machine by loading executable instructions contained within the program modules 760. These computer-executable instructions may transform the processor 710 by specifying how the processor 710 transitions between states, thereby transforming the transistors or other circuit elements constituting the processor 710 from a first machine to a second machine. The states of either machine may also be transformed by receiving input from the one or more user input devices 790, the network interface 796, other peripherals, other interfaces, or one or more users or other actors. Either machine may also transform states, or various physical characteristics of various output devices such as printers, speakers, video displays, or otherwise.

Encoding the program modules 760 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, or the like. For example, if the storage media are implemented as semiconductor-based memory, the program modules 760 may transform the physical state of the semiconductor memory 720 when the software is encoded therein. For example, the software may transform the state of transistors, capacitors, or other discrete circuit elements constituting the semiconductor memory 720.

As another example, the storage media may be implemented using magnetic or optical technology such as drives 730. In such implementations, the program modules 760 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

FIG. 8 is a schematic diagram illustrating computer program products 800 for waved time multiplexing, arranged in accordance with at least some embodiments presented herein. An illustrative embodiment of the example computer program product 800 is provided using a signal bearing medium 802, and may include at least one instruction 804. The at least one instruction 804 may include: one or more instructions for transmitting a command flit from a sender node of a network-on-chip ("NOC") to a destination node of the NOC via at least one intermediate node along a circuit-switched path, wherein the command flit includes an interval period and a release duration; or one or more instructions for upon transmitting the command flit, transmitting one or more data flits of a data packet from the sender node to the destination node via the intermediate node along the circuit-switched path, wherein the sender node, the destination node, and the intermediate node are configured to reserve router resources of the sender node, the destination node, and the intermediate node respectively for circuit-switched traffic during a use duration of the interval period and to release the router resources for packet-switched traffic during the release duration in a waved time multiplex arrangement. In some embodiments, the signal bearing medium 802 of the one or more computer program products 800 include a computer readable medium 806, a recordable medium 808, and/or a communications medium 810.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, or the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for operating a hybrid circuit-switched and packet-switched network-on-chip (NOC), the method comprising:
    transmitting a setup packet for requesting establishment of a circuit-switched path from a sender node on the NOC to a destination node on the NOC, wherein the circuit-switched path includes one or more intermediate nodes arranged between the sender node and the destination node;
    when the setup packet traverses the intermediate nodes, at each intermediate node, establishing the circuit-switched path;
    receiving the setup packet at the destination node;
    in response to receiving the setup packet at the destination node, selecting a primary utilization rate from one or more utilization rates included in the setup packet, determining an interval period for circuit switched traffic and a release duration for packet-switched traffic or other circuit-switched traffic based on the primary utilization rate, and generating an acknowledgement packet for confirming establishment of the circuit-switched path, wherein the acknowledgement packet includes the interval period and the release duration; and transmitting the acknowledgement packet from the destination node to the sender node, wherein the sender node reserves router resources of the sender node for circuit-switched traffic during a use duration of the interval period and releases the router resources for packet-switched traffic or other circuit-switched traffic during the release duration.

2. The method of claim 1, further comprising:
generating a command flit including the interval period and the release duration;
transmitting the command flit from the sender node through the intermediate nodes along the circuit-switched path, wherein each of the intermediate nodes reserves additional router resources of the each of the intermediate nodes for circuit-switched traffic during the use duration of the interval period and releases the additional router resources of the each of the intermediate nodes for packet-switched traffic during the release duration according to the command flit; and
in response to transmitting the command flit, transmitting one or more data flits from the sender node through the intermediate nodes along the circuit-switched path.

3. The method of claim 2, further comprising:
receiving the command flit at the destination node; and
configuring the destination node to reserve third router resources of the destination node for circuit-switched traffic during the use duration of the interval period and to release the third router resources of the each of the intermediate nodes for packet-switched traffic during the release duration according to the command flit.

4. The method of claim 2, wherein each of the intermediate nodes initiates the interval period and the release duration after receiving the command flit.

5. The method of claim 1, further comprising:
obtaining, when the setup packet traverses one or more of the intermediate nodes, the one or more utilization rates of existing traffic at the intermediate nodes; and
appending the one or more of the utilization rates to the setup packet to form an appended setup packet, and wherein receiving the setup packet at the destination node comprises receiving the appended setup packet at the destination node.

6. The method of claim 5, wherein the intermediate nodes comprise a first intermediate node and a second intermediate node; and wherein when the setup packet traverses the intermediate nodes, establishing the circuit-switched path at each intermediate node, obtaining one or more utilization rates of packet-switched traffic at the one or more of the intermediate nodes, and appending the utilization rates to the setup packet to form the appended setup packet at the one or more of the intermediate nodes comprises:
when the setup packet traverses the first intermediate node, establishing the circuit-switched path at the first intermediate node, obtaining a first utilization rate of packet-switched traffic from the first intermediate node, and appending the first utilization rate to the setup packet; and
when the setup packet traverses the second intermediate node, establishing the circuit-switched path at the second intermediate node, obtaining a second utilization rate of packet-switched traffic from the second intermediate node, and appending the second utilization rate to the setup packet.

7. The method of claim 6, wherein the first intermediate node comprises a processor core, a cache memory, and a router including one or more input ports and one or more output ports; and wherein obtaining the first utilization rate of packet-switched traffic from the first intermediate node comprises:
obtaining a first candidate utilization rate of packet-switched traffic of the input port;
obtaining a second candidate utilization rate of packet-switched traffic of the output port; and
selecting a maximum of the first candidate utilization rate and the second candidate utilization rate to form the first utilization rate.

8. The method of claim 6, wherein selecting the primary utilization rate from the utilization rates comprises selecting a maximum of the first utilization rate and the second utilization rate to form the primary utilization rate.

9. The method of claim 6, wherein selecting the primary utilization rate from the utilization rates comprises determining an average of the first utilization rate and the second utilization rate to form the primary utilization rate.

10. The method of claim 1, wherein determining the interval period and the release duration of the interval period based on the primary utilization rate comprises determining the interval period and the release duration such that the release duration divided by the interval period equals the primary utilization rate.

11. The method of claim 1, wherein transmitting the setup packet for requesting establishment of the circuit-switched path from the sender node on the NOC to the destination node on the NOC comprises transmitting the setup packet to a plurality of destination nodes on the NOC.

12. The method of claim 1, wherein the sender node comprises a first counter and a second counter, wherein the method further comprises:
setting the first counter to a result of the interval period minus the release duration; and
setting the second counter to the release duration, wherein the sender node is reserves the router resources of the sender node for circuit-switched traffic during the use duration of the interval period according to the first counter and releases the router resources for the packet-switched traffic during the release duration according to the second counter.

13. The method of claim 12, further comprising:
decrementing the first counter after being initiated;
initiating decrementing of the second counter after the first counter reaches zero; and
re-initiating the first counter after the second counter reaches zero.

14. The method of claim 1, wherein the transmitting the setup packet from the sender node comprises transmitting the setup packet from a processor core, a cache memory, and a router comprising input ports, output ports, a switch, and links; and wherein reservation and release of the router resources of the sender node comprise reservation and release of the input ports, the output ports, the switch, and the links.

15. The method of claim 2, further comprising:
receiving, at the sender node, a failure packet indicating that establishment of the circuit-switched path has failed;
upon receiving the failure packet, transmitting the data flits of the data packet via a packet-switched path from the sender node to the destination node.

16. A method for operating a hybrid circuit-switched and packet-switched network-on-chip (NOC), the method comprising:

transmitting a command flit from a sender node of the NOC to a destination node of the NOC via at least one intermediate node along a circuit-switched path, wherein the command flit includes an interval period for circuit-switched traffic and a release duration for packet-switched traffic; and in response to transmitting the command flit, transmitting one or more data flits of a data packet from the sender node to the destination node via the intermediate node along the circuit-switched path, wherein the sender node, the destination node, and the intermediate node reserve router resources of the sender node, the destination node, and the intermediate node respectively for circuit-switched traffic during a use duration of the interval period and release the router resources for packet-switched traffic during the release duration in a waved time multiplex arrangement.

17. The method of claim 16, wherein according to the waved time multiplex arrangement, the sender node releases first router resources of the sender node before the intermediate node releases second router resources of the intermediate node, and the intermediate node releases the second router resources before the destination node releases third router resources of the destination node.

18. The method of claim 16, wherein transmitting the command flit including the interval period and the release duration comprises transmitting the command flit including the interval period and the release duration, wherein a result of the release duration divided by the interval period indicates a fraction of a total capacity usable for other traffic.

19. The method of claim 18, wherein transmitting the command flit including the interval period and the release duration comprises transmitting the command flit including the interval period and the release duration, wherein a second result of one minus the result indicates a second fraction of the total capacity usable for circuit-switched traffic along the circuit-switched path.

20. The method of claim 16, further comprising:

obtaining, when the setup packet traverses the at least one intermediate node, the one or more utilization rates of existing traffic at the at least one intermediate node; and appending the one or more of the utilization rates to the setup packet to form an appended setup packet, and wherein receiving the setup packet at the destination node comprises receiving the appended setup packet at the destination node.

21. The method of claim 20, wherein the destination router is determines the interval period and the release duration based on the one or more utilization rates, generates an acknowledgement packet for confirming the establishment of the circuit-switched path, and transmits the acknowledgement packet to the sender router, the acknowledgement packet including the interval period and the release duration.

22. A multicore chip having a hybrid circuit-switched and packet-switched network-on-chip (NOC), the multicore chip comprising:

a sender tile comprising a sender processor core, a sender cache memory, and a sender router of the NOC;

at least one intermediate tile comprising an intermediate processor core, an intermediate cache memory, and an intermediate router of the NOC;

a destination tile comprising a destination processor core, a destination cache memory, and a destination router of the NOC;

wherein the sender router is configured to transmit to the destination router a setup packet for requesting establishment of a circuit-switched path including the intermediate router;

wherein the intermediate router is configured to receive the setup packet, establish the circuit-switched path, obtain a utilization rate of packet-switched traffic of the intermediate router, and append the utilization rate to the setup packet to form an appended setup packet;

wherein the destination router is configured to receive the appended setup packet, determine an interval period for circuit-switched traffic and a release duration for packet-switched traffic based on the utilization rate, generate an acknowledgement packet for confirming the establishment of the circuit-switched path, and transmit the acknowledgement packet to the sender router, the acknowledgement packet including the interval period and the release duration; and wherein the sender router is further configured to receive the acknowledgement packet, reserve router resources of the sender router for circuit-switched traffic during an initiation of the interval period and release the router resources for packet-switched traffic during an initiation of the release duration.

23. The multicore chip of claim 22, wherein the sender router is further configured to generate a command flit including the interval period and the release duration, transmit the command flit through the intermediate router along the circuit-switched path, and when the command flit has been transmitted, transmit one or more data flits of a data packet through the intermediate router along the circuit-switched path; and wherein the intermediate router is configured to (a) receive the command flit, (b) when the command flit has been received, reserve additional router resources of the intermediate router for circuit-switched traffic during a second initiation of the interval period and release the additional router resources for packet-switched traffic during a second initiation of the release duration, and (c) receive the data flits.

24. The multicore chip of claim 22, wherein the second initiation of the interval period by the intermediate router is after the initiation of the interval period by the sender router; and wherein the second initiation of the release duration by the intermediate router is after the initiation of the release duration by the sender router.

25. The multicore chip of claim 22, wherein the destination tile comprises a plurality of destination tiles.

* * * * *

UNITED STATES PATENT AND TRADEMARK OFFICE
CERTIFICATE OF CORRECTION

PATENT NO. : 9,166,930 B2
APPLICATION NO. : 13/823361
DATED : October 20, 2015
INVENTOR(S) : Solihin Page 1 of 2

It is certified that error appears in the above-identified patent and that said Letters Patent is hereby corrected as shown below:

On the Title Page, in Column 2, Line 1, delete "9 Drawing Sheets" and insert -- 8 Drawing Sheets --, therefor.

In the Drawings:

On Sheet 2 of 9, delete "Sheet 2 of 9" and insert -- Sheet 2 of 8 --, therefor.

On Sheet 3 of 9, delete "Sheet 3 of 9" and insert -- Sheet 3 of 8 --, therefor.

On Sheet 4 of 9, delete "Sheet 4 of 9" and insert -- Sheet 4 of 8 --, therefor.

On Sheet 5 of 9, delete "Sheet 5 of 9" and insert -- Sheet 5 of 8 --, therefor.

On Sheet 6 of 9, delete "Sheet 6 of 9" and insert -- Sheet 6 of 8 --, therefor.

On Sheet 7 of 9, delete "Sheet 7 of 9" and insert -- Sheet 7 of 8 --, therefor.

In Fig. 7, Sheet 7 of 9, for Tag "752", in Line 2, delete "CONTROLLER" and insert -- MULTIPLEXING CONTROLLER --, therefor.

On Sheet 8 of 9, delete "Sheet 8 of 9" and insert -- Sheet 8 of 8 --, therefor.

Signed and Sealed this
Twenty-third Day of August, 2016

Michelle K. Lee
*Director of the United States Patent and Trademark Office*

CERTIFICATE OF CORRECTION (continued)
U.S. Pat. No. 9,166,930 B2

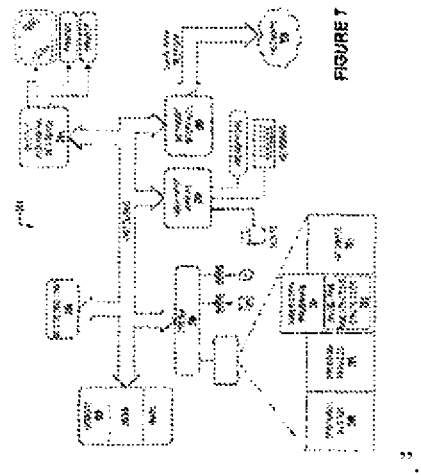

In Fig. 7, Sheet 9 of 9, delete "                    ".

In the Specification:

In Column 1, Line 7, delete "§371" and insert -- § 371 --, therefor.